(12) United States Patent
Kallevig et al.

(10) Patent No.: US 6,551,050 B1
(45) Date of Patent: Apr. 22, 2003

(54) ROLLING STABILIZER LIFT ATTACHMENT

(75) Inventors: Bruce E. Kallevig, Monticello, MN (US); Brian Nelson, Spicer, MN (US)

(73) Assignee: Kaltec of Minnesota, Monticello, MN (US)

(*) Notice: Subject to any disclaimer, the term of this patent is extended or adjusted under 35 U.S.C. 154(b) by 0 days.

(21) Appl. No.: 09/602,979

(22) Filed: Jun. 23, 2000

Related U.S. Application Data
(60) Provisional application No. 60/141,074, filed on Jun. 25, 1999.

(51) Int. Cl.[7] ................................................ B66F 9/22
(52) U.S. Cl. ........................ 414/607; 180/209; 187/232
(58) Field of Search ................................. 414/607, 673, 414/458, 460, 722, 628, 634; 212/304, 305; 180/24.02, 209; 187/222, 231, 232, 237, 238

(56) References Cited

U.S. PATENT DOCUMENTS

| | | | | |
|---|---|---|---|---|
| 2,846,018 A | * | 8/1958 | Puckett | 187/231 |
| 2,875,852 A | * | 2/1959 | Morrell | 187/229 |
| 2,899,093 A | * | 8/1959 | Morrell | 414/639 |
| 2,925,887 A | * | 2/1960 | Gibson | 187/232 |
| 3,388,820 A | * | 6/1968 | Lebre | 414/460 |
| 3,391,905 A | * | 7/1968 | Burns | 212/901 |
| 3,908,849 A | * | 9/1975 | Carroll | 414/634 |
| 3,966,070 A | | 6/1976 | Barth | 414/607 |
| 4,101,040 A | * | 7/1978 | Stolley | 414/458 |
| 4,177,001 A | * | 12/1979 | Blackwood | 414/628 |
| 4,482,287 A | * | 11/1984 | Menzi | 212/305 |
| 4,655,670 A | * | 4/1987 | Hogberg et al. | 414/458 |
| 4,688,981 A | * | 8/1987 | Ravnsborg et al. | 414/607 |
| 4,708,576 A | | 11/1987 | Conley | 414/607 |
| 4,755,100 A | * | 7/1988 | Schultz et al. | 414/635 |
| 4,826,474 A | * | 5/1989 | Holmes | 414/699 |
| 5,018,930 A | * | 5/1991 | Hardin et al. | 414/458 |
| 5,115,720 A | * | 5/1992 | Babson et al. | 91/448 |
| 5,174,415 A | * | 12/1992 | Neagle et al. | 187/231 |
| 5,374,155 A | | 12/1994 | Van Baale et al. | 414/607 |
| 5,387,075 A | | 2/1995 | Aoki | 414/686 |
| 5,405,237 A | | 4/1995 | Oka | 414/685 |
| 5,409,346 A | * | 4/1995 | Grether | 414/635 |
| 5,544,381 A | * | 8/1996 | Alexander | 14/71.7 |
| 5,599,158 A | | 2/1997 | Ajilore | 414/722 |
| 5,692,325 A | | 12/1997 | Kuzutani | 414/723 |
| 5,813,697 A | * | 9/1998 | Bargenquast et al. | 414/754 |
| 5,820,330 A | * | 10/1998 | Focke et al. | 187/231 |
| 5,921,743 A | | 7/1999 | Slagter | 414/722 |
| 5,938,399 A | | 8/1999 | Knutson | 414/722 |
| 5,951,236 A | * | 9/1999 | Thompson | 414/607 |
| 5,975,826 A | * | 11/1999 | Scholder | 414/444 |
| 6,022,183 A | * | 2/2000 | Walters et al. | 414/607 |
| 6,033,177 A | * | 3/2000 | Kooima | 414/642 |
| 6,065,926 A | * | 5/2000 | Knapp | 414/607 |
| 6,099,234 A | * | 8/2000 | Mason | 414/635 |
| 6,343,674 B1 | * | 2/2002 | Sexsmith | 414/460 |

FOREIGN PATENT DOCUMENTS

WO    WO 99/50170    10/1999

\* cited by examiner

*Primary Examiner*—Eileen D. Lillis
*Assistant Examiner*—Paul T. Chin
(74) *Attorney, Agent, or Firm*—Patterson, Thuente, Skaar & Christensen, P.A.

(57) ABSTRACT

An attachment for skid steer loaders and the like which combines a forklift mast with width adjustable rolling stabilizer outriggers. The ground engaging rolling stabilizer caster wheels are positioned to each side of the lifted load. The castering wheels bear a large fraction of the weight of the lifted load as well as stabilizing the load while it is in motion over varying terrain. The rolling stabilizer lift dramatically increases the weight lifting capacity and the height to which loads can be lifted beyond that of the loader alone.

20 Claims, 8 Drawing Sheets

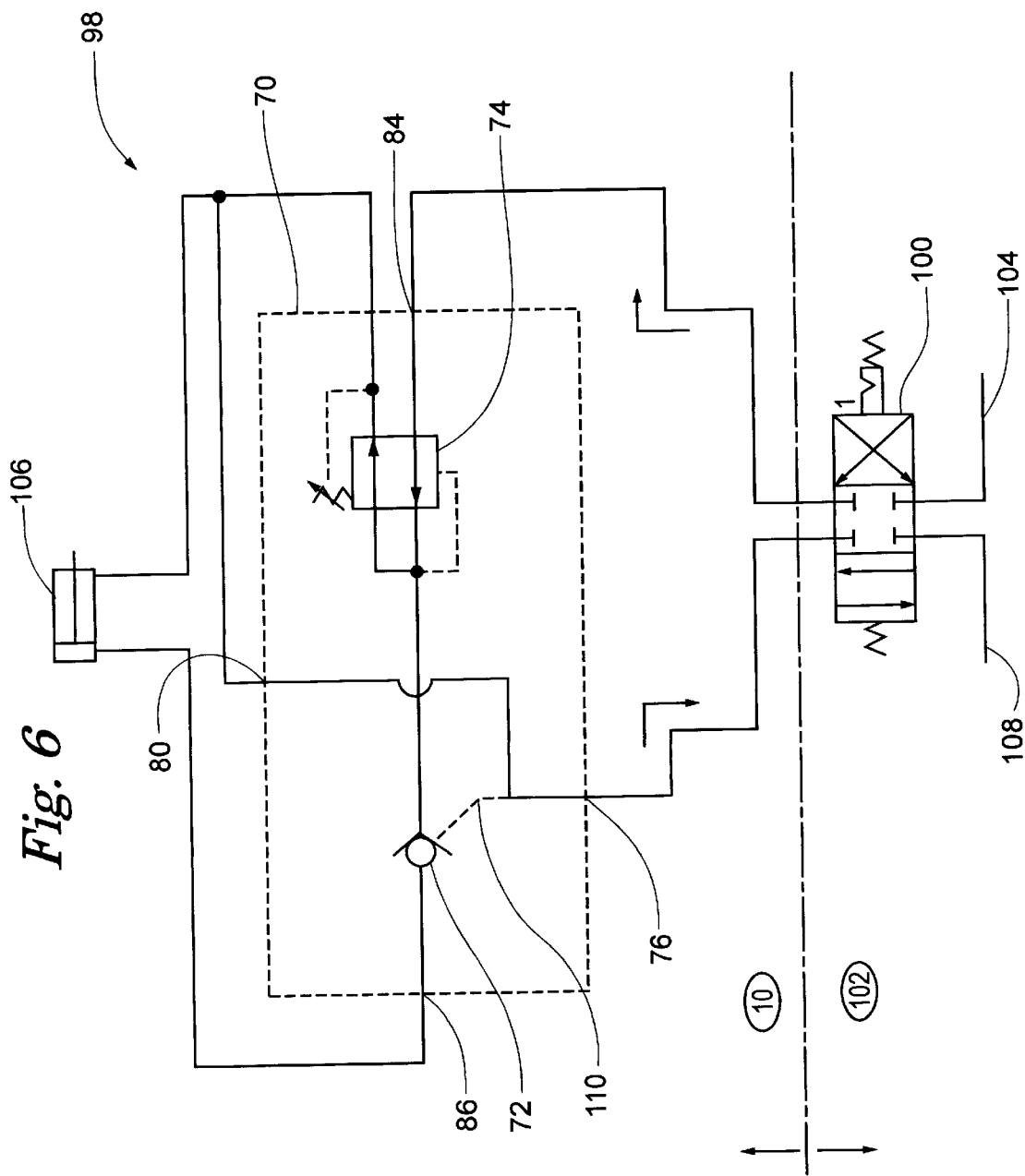

ARM LENGTH →

ROLLING STABILIZER LIFT ATTACHMENT

RELATED APPLICATION

This application claims the benefit of Provisional Application No. 60/141,074 filed on Jun. 25, 1999, which is incorporated herein in its entirety by reference.

FIELD OF THE INVENTION

The invention relates to the field of lifting attachments for small power units such as skid steer loaders, Dingoes®, small tractors and "four wheeler" ATVs. More particularly it relates to a forklift attachment with rolling stabilizers for skid steer loaders and the like.

BACKGROUND OF THE INVENTION

A wide variety of versatile motorized prime movers are used in the construction, maintenance, and grounds upkeep industries. These include skid steer loaders, light tractors, garden tractors, "four wheeler" all terrain vehicles, and many other compact power units. Skid steer loaders, in particular, are widely employed for a variety of material handling, earth moving and transportation tasks.

In general, these devices are favored for their compact size, maneuverability and ability to utilize many attachments to accomplish a variety of jobs. The need for these units to be readily transported, generally on a trailer pulled by a pickup truck or other small truck, limits their overall weight. In addition, their high maneuverability is a consequence of their short wheelbase and overall length.

Counterweights may be used at the opposite end of the power unit from load lifting attachments to balance the vehicle. In order to balance a massive load, a long moment arm or a heavy counterweight must be used. Consequently, the ability of these units to lift loads is limited by the need to keep the overall length and weight of the power unit relatively small.

For example, skid steer loaders used in landscaping may be fitted with fork attachments to move pallets supporting rolls of sod or concrete landscaping materials. An example of such a device is disclosed in U.S. Pat. No. 3,458,069 to Wickberg et al. Fully loaded pallets of landscaping or construction materials are commonly heavy enough to exceed the capacity of the machine to lift them with out raising the rear wheels from the ground. This forces the contractor to use only partially loaded pallets; to employ other machinery at significant expense; or to redistribute at least some of the materials by hand labor. All of these options are inefficient and costly.

In addition to lifting loads, compact power units are used to move lifted loads to a variety of locations over many types of terrain. For example, in the construction and landscaping industries, loads are often moved over unpaved surfaces, up, down and across slopes and over generally uneven ground. In order to maintain stability of the vehicles as they currently exist, loads must be kept low and close to the center of gravity of the vehicle. Tall, heavy loads in combination with a slope or uneven ground can cause compact vehicles to be dangerously unstable or even to overturn.

The versatility of these already flexible machines would be even greater if their lifting capacity were increased without significantly increasing their weight or reducing maneuverability. Particularly the ability to lift and transport pallets of heavy materials safely over uneven terrain is beneficial. An increase in the height to which loads can be lifted would also be helpful. Additionally, it would be desirable that the stability of the loader, the lifted load and attachment be maximized.

SUMMARY OF THE INVENTION

The present invention increases the lifting capacity of the power unit it is attached to dramatically beyond that of the power unit alone. It makes practical the safe, stable transport of heavy loads over uneven terrain that cannot be accomplished by the power unit alone. In addition, the invention allows lifting to a greater height than the loader alone is capable of.

The present invention is a rolling stabilizer lift attachment that is designed to be manufactured as a product family. Different size ranges of the invention may be manufactured to fulfill different user requirements, the needs of different industries and different pricing categories. The rolling stabilizer lift is adjustable to varying working conditions, providing maximum load stability when desired and offering a compact configuration for operating in restricted spaces.

The lift attachment comprises five major components: a mounting plate, a lifting mast, a right rolling stabilizer, a left rolling stabilizer, and lifting forks or other load engaging apparatus. The rolling stabilizer lift may be adapted to attach to a large variety of power units so long as the power unit is sufficiently powerful to move the intended load.

The mounting plate may be adapted to accommodate coupling to many different types of power equipment. The mounting plate may be attached to the rest of the assembly by a freely rotating lateral pivot, in order to allow the rolling stabilizers to remain in full contact with the ground despite irregularity of the terrain. The rotation of the pivot may be limited to prevent the rolling stabilizer load from overturning if the ground is dramatically irregular and to allow the attachment to be raised from the ground safely. Additionally, the rotation of the pivot may be restricted from free rotation by a braking mechanism. Some applications may benefit from a non-pivoting attachment.

The right and left rolling stabilizers or outriggers each comprise a width adjustable support and a swiveling, caster mounted support wheel and tire. The rolling stabilizers are similar aside from being opposite handed. The rolling stabilizers place the load bearing caster wheels somewhat ahead of and to the sides of the lifting mast.

The lifting mast is generally centered between the rolling stabilizers and provides a means for lifting loads. The lifting mast may lift the load via lifting forks however, bale spears, buckets and other load engaging devices may also be utilized. In most cases, the lifting mast will be actuated hydraulically although other actuation approaches may be used. If the power unit connected to the rolling stabilizer lift has a hydraulic power supply, it may be used to operate the lifting mast or a self contained power supply unit may be incorporated on the lift attachment itself. It is preferred that the lifting mast be configured to lift to a height of at least eight feet.

In connecting the hydraulic system of the rolling stabilizer lift to the hydraulic pressure supply of the power unit a safety issue arises. It is possible for the operator to disconnect the two systems, intentionally or inadvertently, while a load is still supported by the lifting mast. The power unit may also become disabled or suffer power loss. Upon disconnection of the pressure supply, or if the accidental severance of a hydraulic connection should occur, the load could drop causing damage or injury. Additionally, the release of hydraulic fluid under pressure may be hazardous. A safety device to prevent these occurrences is thus a desirable part of the invention.

The safety device comprises a manifold combining a pilot operated check valve with a pressure relief valve. The resulting integrated valve system requires hydraulic pressure to be maintained in the circuit to actuate lift cylinder lowering. If hydraulic pressure is lost, the pilot operated check valve closes holding the lift cylinder in its then current position. The manifold reduces the need for plumbing between individual hydraulic components.

In use, the rolling stabilizer lift attachment is attached to a power unit via the mounting plate. The width of separation of the stabilizers may be adjusted as appropriate for the job at hand. The power unit may be driven as usual allowing for the added space requirements of the lift attachment. Power units that have independent lift modules may lift the attachment off the ground to facilitate relocation of the rolling stabilizer lift when the unit is not loaded, for example, to place the rolling stabilizer lift on a truck or trailer for transport.

BRIEF DESCRIPTION OF THE DRAWINGS

FIG. 6 is a schematic view of the hydraulic circuitry of the rolling stabilizer lift;

DETAILED DESCRIPTION OF THE INVENTION

Figure 1:
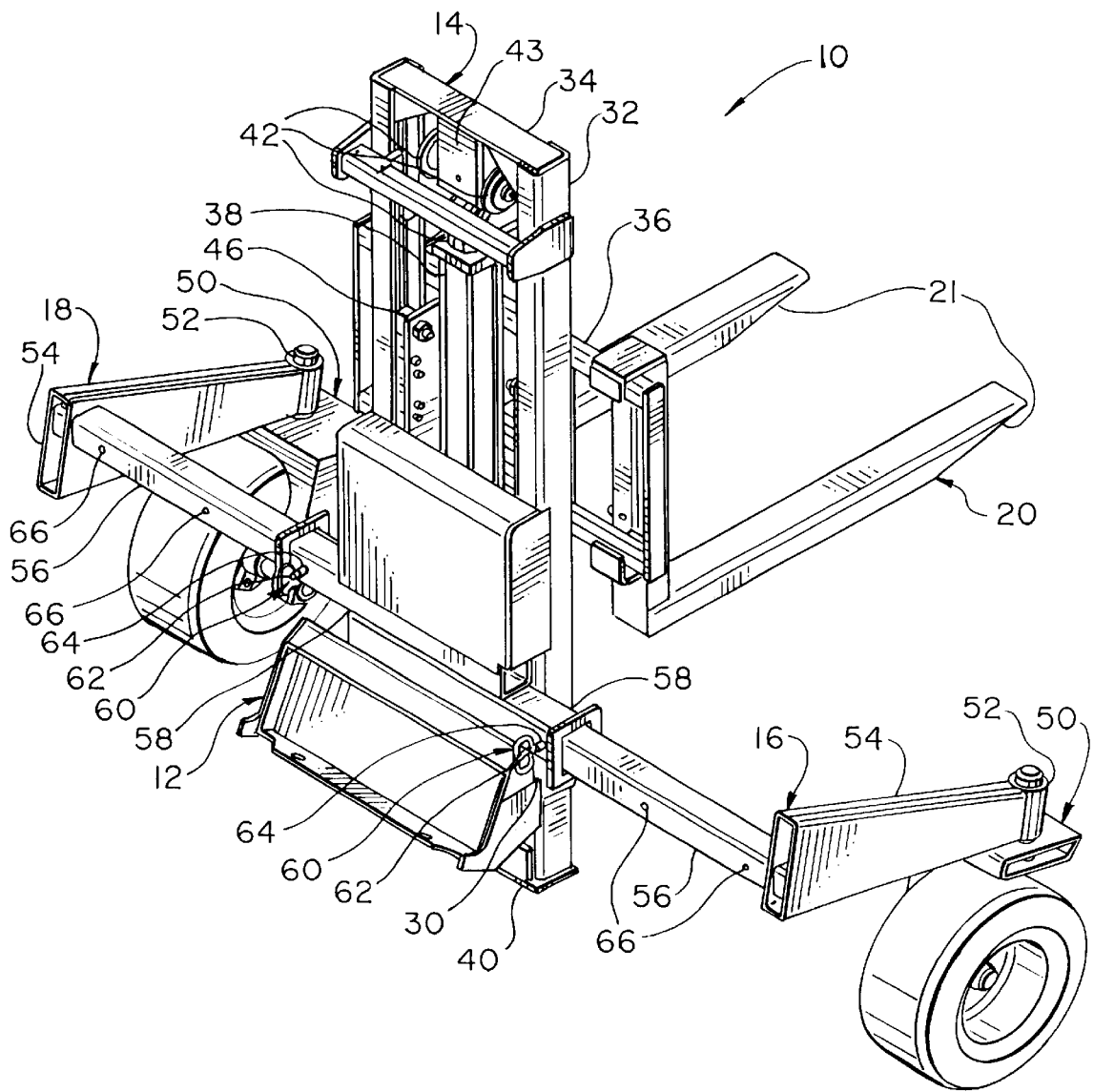
FIG. 1 is a right rear perspective view of a rolling stabilizer lift in accordance with the present invention.
Figure 2:
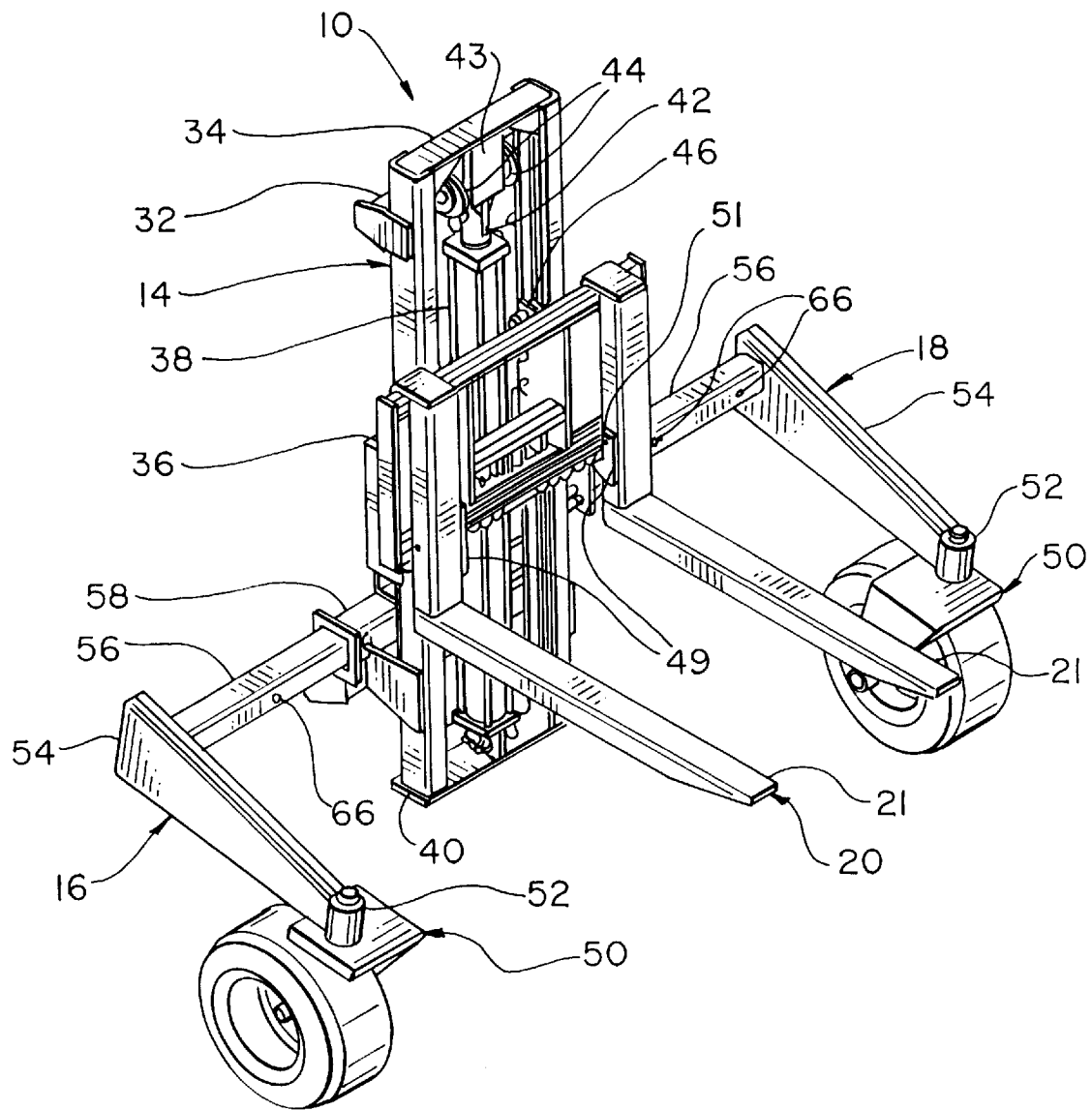
FIG. 2 is a right front perspective view of the rolling stabilizer lift.
Figure 3:
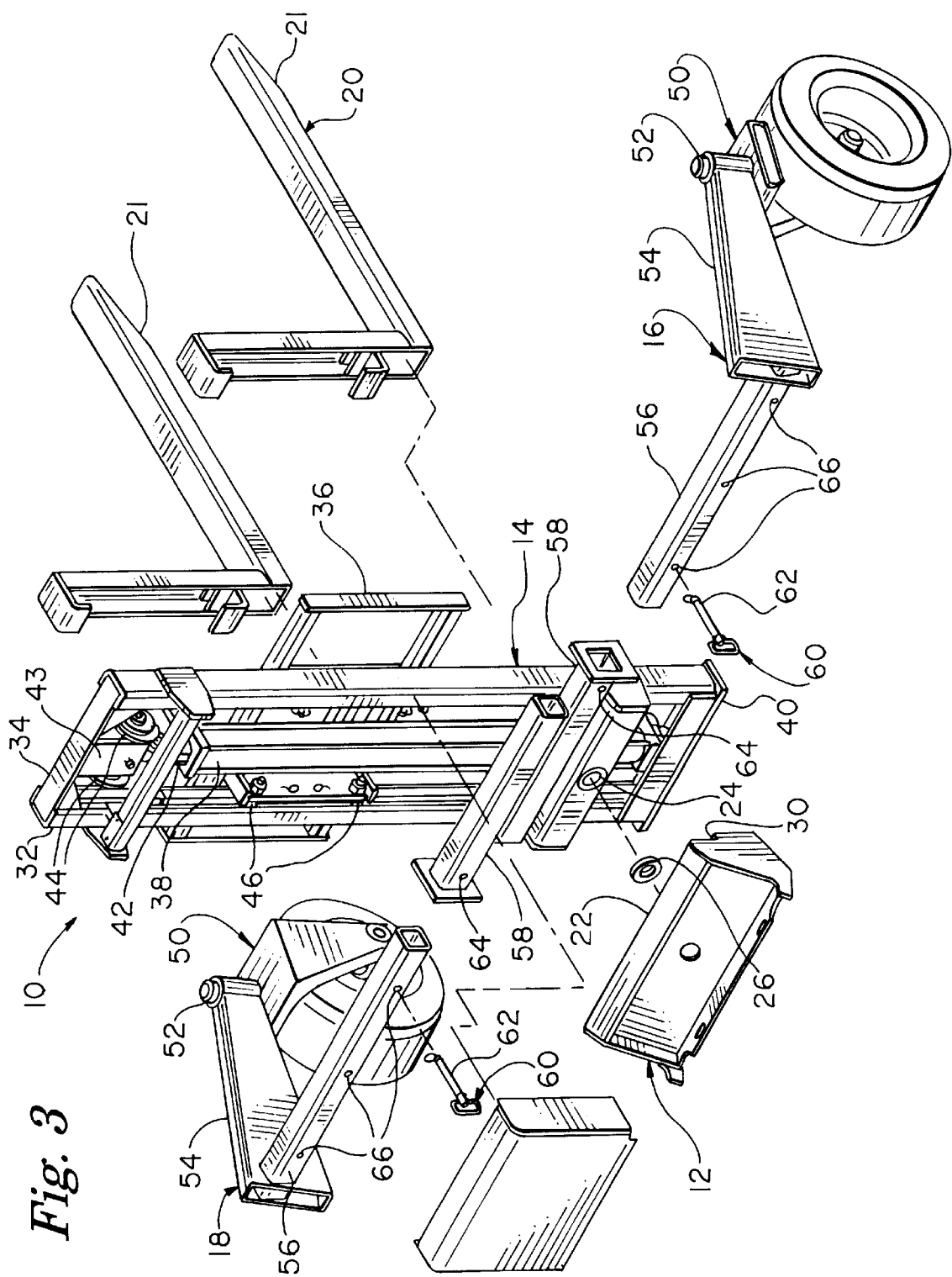
FIG. 3 is an exploded right rear perspective view of the rolling stabilizer lift.

Referring to FIGS. 1, 2 and 3, the rolling stabilizer lift attachment 10 comprises five major components: a mounting plate 12, a lifting mast 14, a right rolling stabilizer 16, a left rolling stabilizer 18, and a load engaging apparatus 20. While lifting forks 21 are depicted and described herein, it will be appreciated that many other types of load engaging apparatus 20 may be employed such as bale spears, buckets or grapples, without departing from the spirit and scope of the invention.

The mounting plate 12 may be pivotably attached to the lifting mast 14 via a freely pivoting shaft 22. The shaft is preferably secured into a bushing 24 with a split clamp collar 26 though other securing devices may be used. The pivot 22 may be restrained from perfectly free rotation by a frictional or spring-loaded brake 28 (not shown). Fixed or adjustable stops 30 may be employed. In some applications a non-pivoting or rigid mounting may be preferred.

The mounting plate 12 may be adapted to removably attach to a large variety of power units so long as the power unit is sufficiently powerful to move the intended load. Power units may include skid steer loaders, Dingoes®, tractors, garden tractors, "four wheeler" ATVs and others. Dingoes® are small wheeled or tracked skid steer power units manufactured by The Toro Company, 8111 Lyndale Avenue South, Bloomington, Minn. 55420. They are unlike other skid steer loaders in that the operator stands on a platform behind the unit rather than riding on or in it. In discussion here, the power unit will often be referred to as a skid steer loader. This should not be considered as limiting.

In the case of power units that have lifting modules of their own, it is important that the rolling stabilizer lift unit be light enough to be lifted by the power unit. In order to fulfill this weight requirement it is preferable that selected parts of the rolling stabilizer lift be constructed of high strength, low alloy steel.

The lifting mast 14 of the rolling stabilizer lift 10 is generally similar to that used in a conventional forklift, and comprises a supporting outer mast 32, a movable inner mast 34 and a movable carriage 36. The lifting mast 14 is preferably pivotably secured to the mounting plate 12 and is scalable to allow use in concert with many different power units. Preferably a hydraulic cylinder or cylinders 38 provide the lifting force though other means of lifting may be employed. Generally, the lifting cylinder 38 is secured at one end to the base 40 of the outer mast 32. The piston rod 42 is coupled at its distal end to bracket 43. Sprockets 44 are rotatably carried by bracket 43 at the upper end thereof. A pair of roller chains (not shown) is connected at one end to the base 40 of the outer mast 32 and at the other end at the base of the carriage 36. The roller chains (not shown) are positioned so that they travel from the outer mast 32 up and over the sprockets 44 and further down to their connection at the base of the carriage 36. The carriage 36 is slidably movable within the inner mast 34 and outer mast 32 supported on rollers 46. The lifting mast 14 preferably has a lifting capacity of at least 1500 pounds and a lifting height of at least eight feet. Other characteristics of the lifting mast 14 are similar in structure to characteristics of conventional forklift masts well known to those skilled in the art.

In one embodiment of the invention, the attached power unit may provide hydraulic power for the lifting mast 14 if the power unit has an integral hydraulic power supply. In this case, appropriate hydraulic connections are provided. In the absence of hydraulics on the power unit the rolling stabilizer lift 10 may have a hydraulic power pack (not shown) incorporated thereupon.

Figure 5:
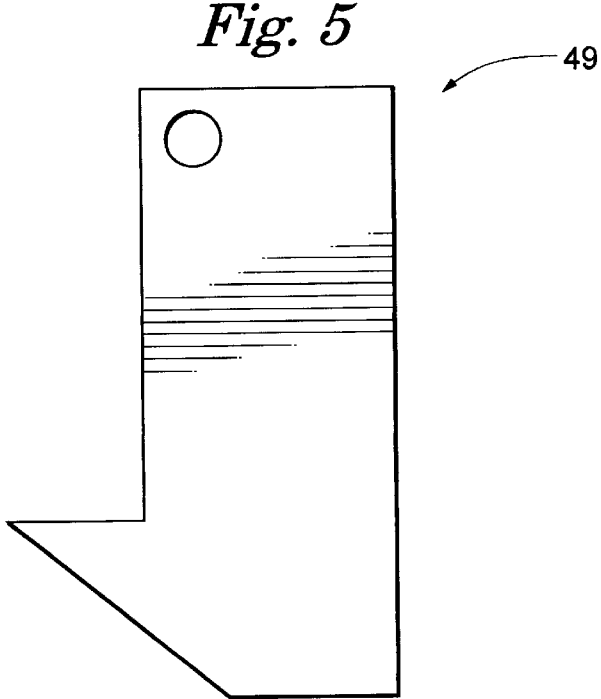
FIG. 5 is an elevational view of a gravity biased engagement hook for use with the rolling stabilizer lift.

The load engaging apparatus 20 may comprise lifting forks 21 which are removably attachable to the carriage 36. Forks 21 may be engaged to the carriage 36 so as to be width adjustable to a plurality of positions. Referring to FIGS. 2 and 5, forks 21 may be engaged to the carriage 36 with the aid of gravity biased engagement hooks 49. Gravity biased hooks 49 are structured so that when hung from their pivot 51, gravity tends to force them to an engaged position. Other load engaging apparatus 20 that may be carried by the carriage 36 include: a bale spear, a grapple hook, a clam shell bucket, a dump box, a tilt box, a sod roller, a lifting boom and the like.

The rolling stabilizers or outriggers 16,18 support position adjustable castering wheel assemblies 50 located to the side and in front of the lifting mast 14. The rolling stabilizers 16,18 are similar, aside from being opposite handed. Each of the rolling stabilizers 16,18 comprises a castering wheel assembly 50, a pivot 52, a support arm 54, a slider 56, a sleeve 58 and a locking device 60. The sleeve 58 is a hollow polygonal tube secured to the fixed outer mast 32. The slider 56 is of similar cross sectional shape to the sleeve 58 and is slidably positionable within the sleeve 58. The distal end of the slider 56 is secured to the support arm 54 which in turn carries a vertical pivot 52 to which the castering wheel assembly 50 is pivotably secured. The rolling stabilizers 16, 18 are thus slidably adjustable in separation. Locking device 60 preferably comprises lock pin 62 receivable through apertures 64 in sleeve 58 and through a plurality of mating apertures 66 through slider 56. The stabilizer arm 54 may be angled down from the horizontal about 10 degrees. The stabilizers 16,18 may be linked to be movable simultaneously or unlinked to adjust individually. A pair of rack gears and a pinion (not shown) may link them, for example, to assure symmetrical spacing. The stabilizers 16,18 may optionally include a power adjustment mechanism.

Figure 4:
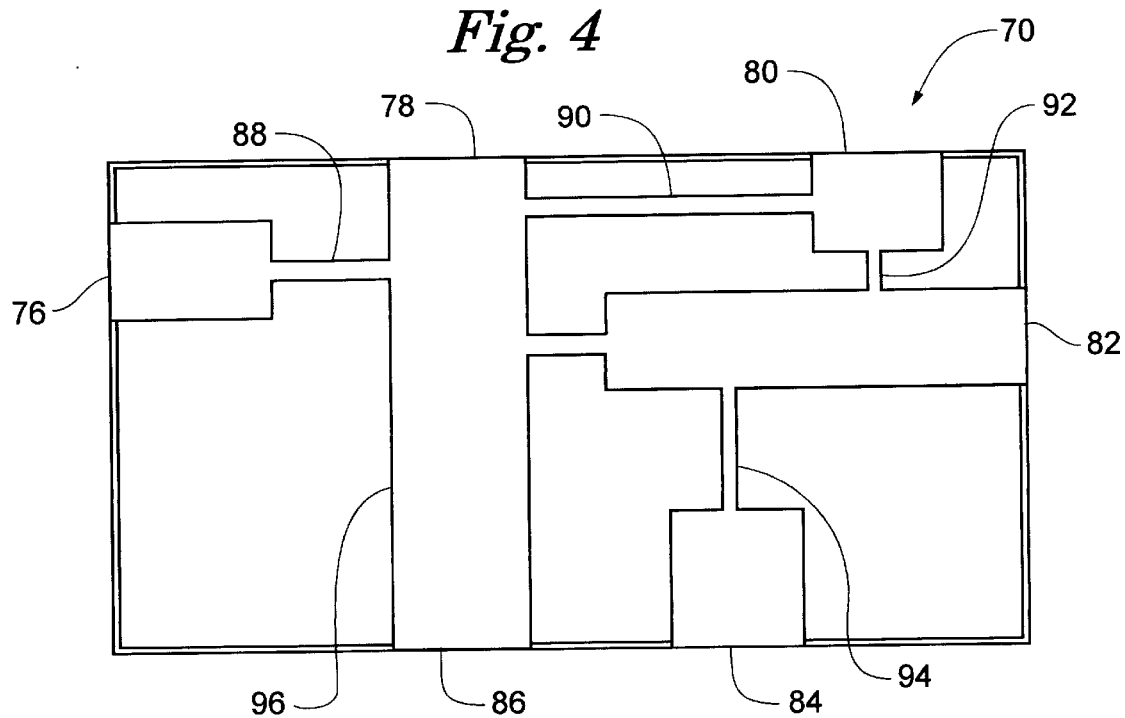
FIG. 4 is a cross sectional schematic view of a hydraulic manifold for use with the rolling stabilizer lift depicting fluid passageways therein.

The hydraulic safety valve manifold 68 depicted in FIGS. 4 and 6 comprises a manifold block 70, a pilot operating check valve 72 and a pressure reducing valve 74.

The pilot operated check valve 72 preferably has a 3.0:1 valve ratio, requiring a pilot pressure of one-third the load pressure at the cylinder to open the valve. The pressure reducing valve 74 is preferably a direct acting, spool type pressure reducing/relieving valve with internal pilot.

Referring to FIG. 4, the manifold block 70 defines a number of ports and connecting fluid passageways. For convenience up, down, right and left will refer to those directions as depicted in FIG. 4. Beginning at the left side and proceeding clockwise, the down control valve port 76, is defined in the left side of the manifold block. The top of the block presents the pilot operated check valve port 78, into which pilot operated check valve 72 may be secured and the down lift cylinder port 80. The right side of the block presents the pressure reducing valve port 82, into which pressure reducing valve 74 may be secured. The bottom of the manifold block presents the up cylinder valve port 84 and the up lift cylinder port 86. First fluid passage 88 interconnects the down control valve port 76 with the pilot operating check valve port 78. Second fluid passage 90 connects the pilot operated check valve port 78 with the down lift cylinder port 80. Third fluid passage 92 connects the down lift cylinder port 80 with the pressure reducing valve port 82. Fourth fluid passage 94 connects the pressure reducing valve port 82 with the up control valve port 84. Finally, fifth fluid passage 96 connects the up lift cylinder port 86 with the pilot operated check valve port 78.

The schematic diagram of FIG. 6 depicts the hydraulic circuit 98 of the rolling stabilizer lift 10 which employs the above described manifold block. Four way directional control valve 100, on the power unit 102, controls whether a lifting circuit or a lowering circuit is active. When four way directional control valve 100 is moved to the right the lifting circuit is active. When it is moved to the left the lowering circuit is activated.

The lifting circuit includes a pressure supply 104, pressure reducing valve 74, pilot operated check valve 72, double acting cylinder 106 and fluid return to tank 108. The lowering circuit includes a pressure supply 104, a branch to pilot of check valve 110, double acting cylinder 106, pilot operated check valve 72 and fluid return to tank 108.

Design factors relating to the rolling stabilizer lift include the relationship between the weight of the power unit, the weight of the rolling stabilizer lift with load, and the positioning of the load bearing wheels. In order to increase the lifting capacity of the power unit, the supporting wheels must be placed appropriately. If the support wheels are placed too near the power unit, too little of the weight of the lift and the load are supported by the arm and wheel assembly, and the load tends to lift the rear wheels of the power unit from the ground, leading to tipping of the power unit. If the wheels are placed too far forward, the weight of the rolling stabilizer lift and load are shifted to the power unit. This negates the benefit of the invention by reducing the load carrying capacity. In addition, moving the supporting wheels farther forward increases the resistance of the lift unit to turning by the power unit. There is a point at which the resistive torque created by friction exceeds the ability of the power unit to apply turning torque to the unit making the power unit and stabilizer lift combination unsteerable.

In summary, if the support arms are too short, the combination of rolling stabilizer lift and power unit will tip over in response to a load. If the arms are too long, the combination will be difficult to steer.

Figure 7A:
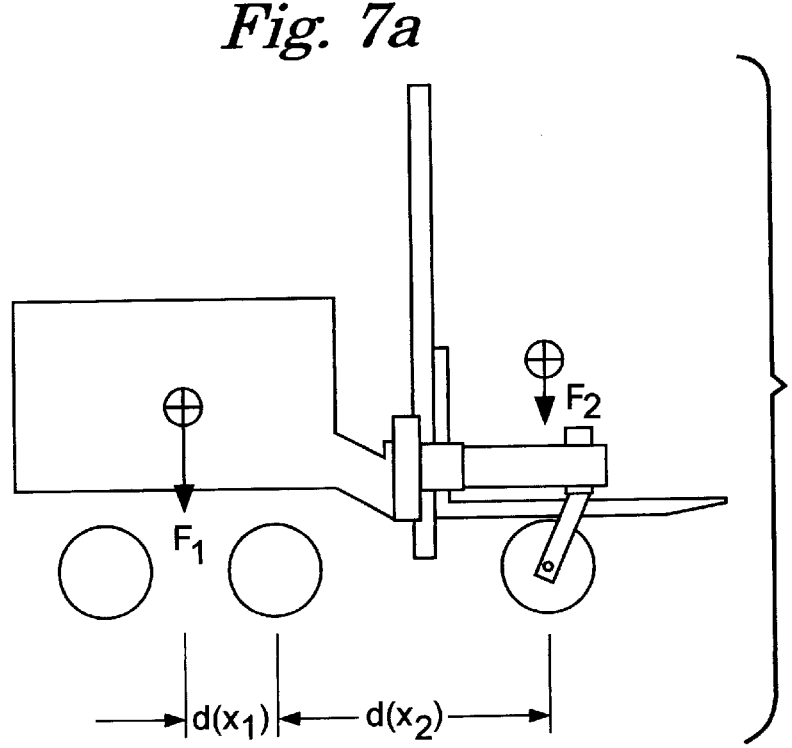
FIGS. 7a and 7b are schematic representations of forces acting on the rolling stabilizer lift and power unit.
Figure 7B:
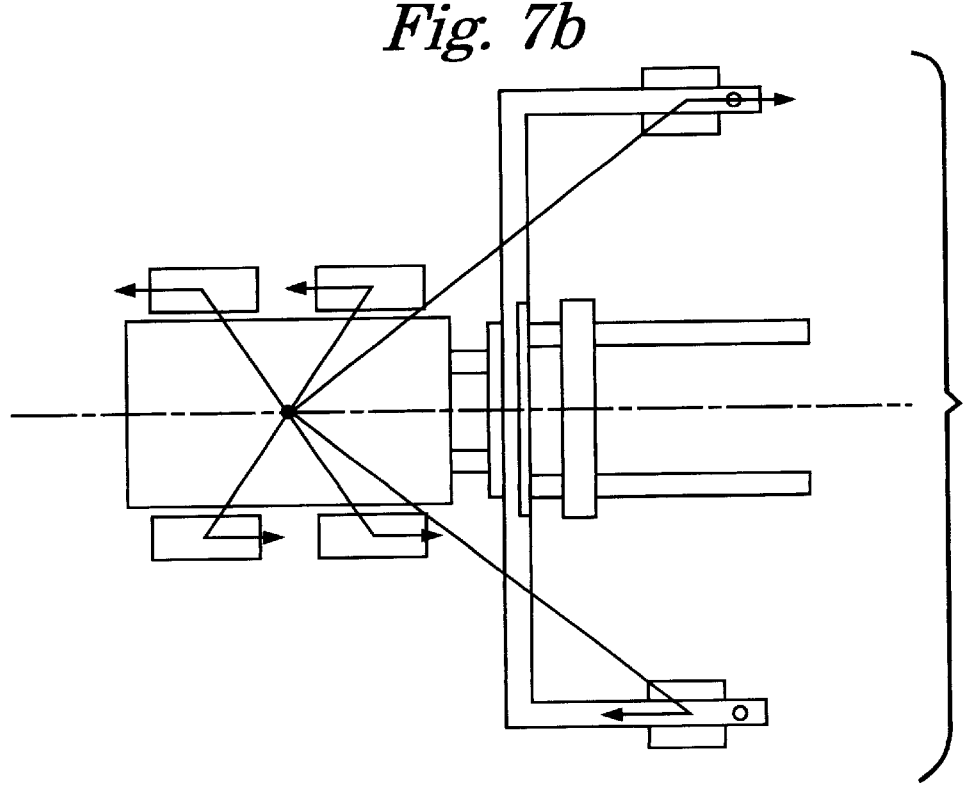

To understand these design issues in greater detail, reference is made to FIG. 7. The schematic diagrams of FIGS. 7a and 7b depict the power unit and the stabilizer lift. The effect of gravity acting upon the power unit creates a force annotated in the drawings as $F_1$. Gravity acts upon the lift unit and load creating a force annotated as $F_2$. Forces $F_1$ and $F_2$ act in opposite directions about a pivot located at the front axle of the power unit. The distance from the pivot point to the center of mass of the power unit is labeled d ($x_1$). The distance from the pivot point to the support wheels is labeled d ($x_2$). The total resistive torque created by friction resisting the turning movement of the assembly labeled $M_{x0}$ is determined by the equation:

$$\Sigma M_{0x} = 0 = \int f[F_1 d(x_1) - F_2 d(x_2)] \quad \text{(Eq. 1)}$$

The turning torque available from the power unit is labeled $M_{y0}$. The turning torque is a function of the force $F_1$ and the coefficient of friction $\mu$. This is defined by the equation:

$$\Sigma M_{y0} = 0 = fN(y) \quad \text{(Eq. 2)}$$

Where $N = F_1 \mu$

Tipping load, labeled $F_t$, represents the load that may be carried by the lifting mast before the load exceeds the counterbalance of the mobile power unit and tips the combination of the power unit and rolling stabilizer lift. The tipping load increases as the length of the rolling stabilizer load is lengthened.

$$F_t = F_2 d(x_2) \quad \text{(Eq. 3)}$$

Figure 8:
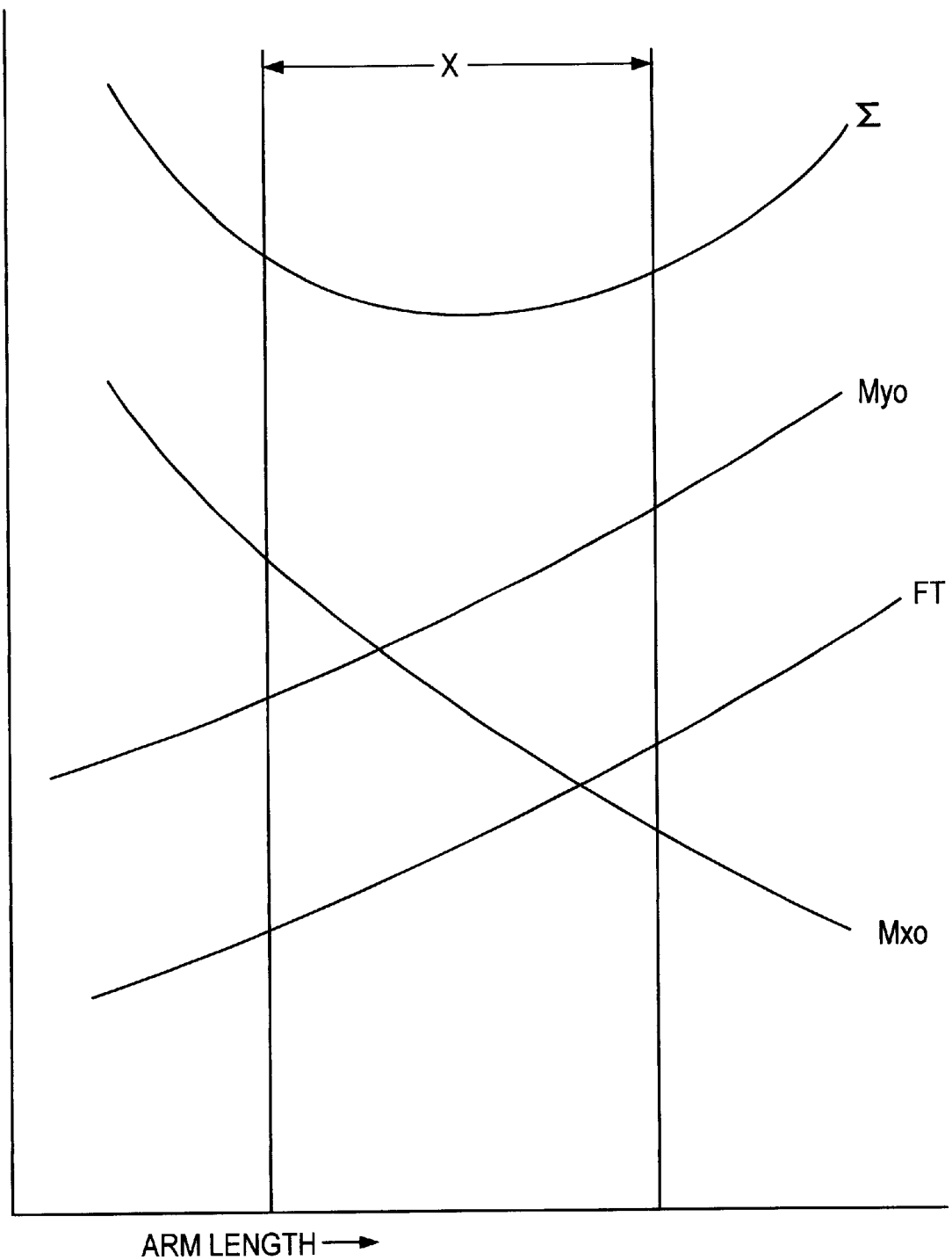
FIG. 8 is a graph depicting the summation of forces and design range of the rolling stabilizer lift.

The graph of FIG. 8 depicts the relationship of support arm length on the x-axis to the magnitude of tipping load, turning torque and resistive torque on the y-axis. The summation of these three quantities creates a curve with a minimum, where the slope of a tangent to the curve is zero, which represents the optimal rolling stabilizer arm length. There is, of course, a design range X, as identified on the graph, within which the performance of the rolling stabilizer lift is acceptable. This design range is limited to the section of the curve that has a slope slightly less than or greater than zero.

Figure 9:
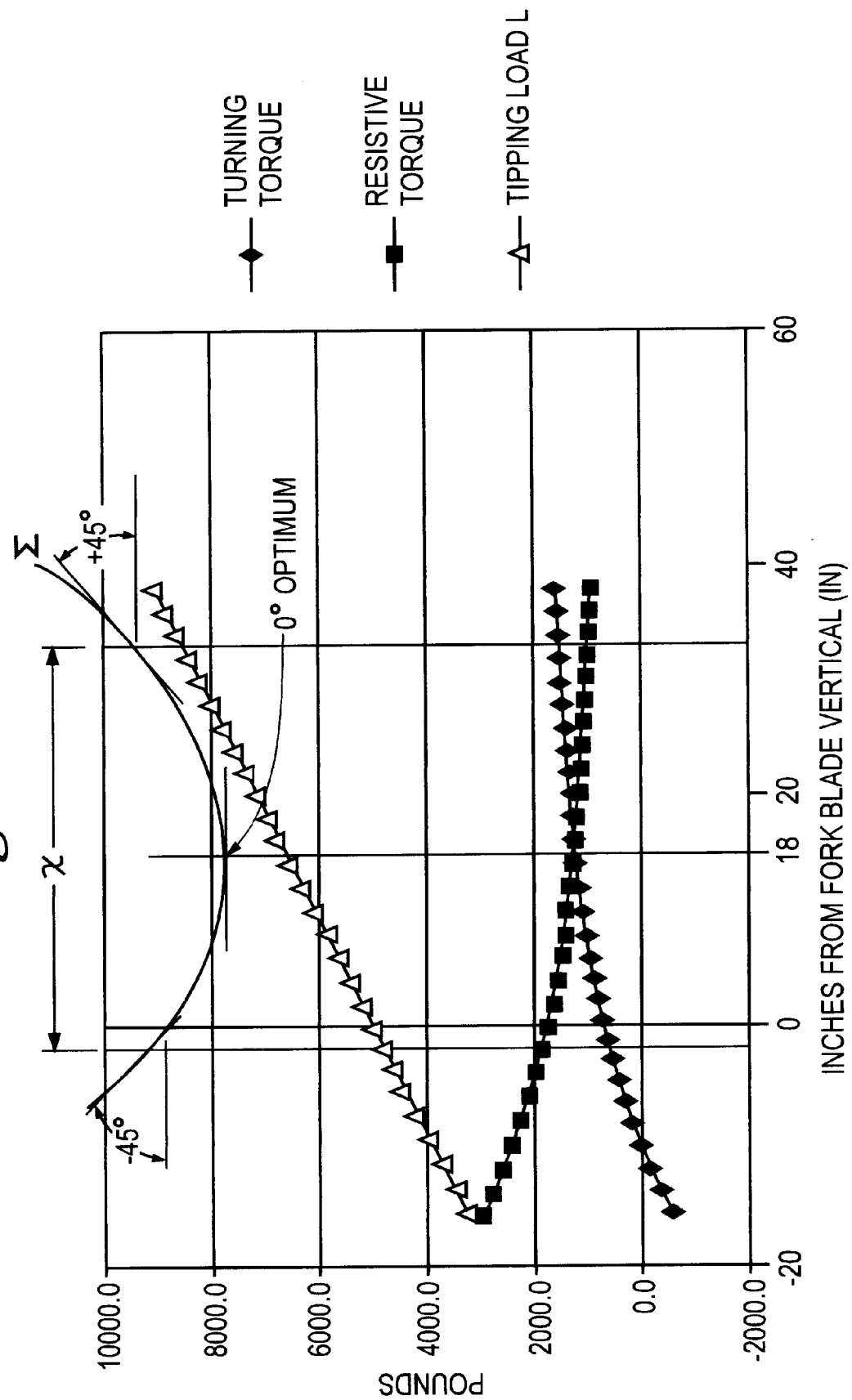
FIG. 9 is a graph depicting the summation of forces and design range of the rolling stabilizer lift for a specific example.

The graph depicted in FIG. 9 shows the relationship for a specific example of a 1500 pound Dingo® and a 3250 pound capacity rolling stabilizer lift. The data points used to create the graph are included in Table 1. The design range is limited to the portion of the summation curve where the slope is substantially zero. The optimum arm length is found where the slope equals zero. For this example the optimum arm length is eighteen inches. The exact curve will vary depending upon the design weight of the power unit, the relative position of the power unit and the lift assembly, and the design lift capacity. The design strategy remains the same and can be used to create a family of products.

In operation, the rolling stabilizer lift 10 is connected to a power unit. If the power unit is equipped with lift arms and a hydraulic system, such as a skid steer loader, appropriate connections are made. In lifting loads, the rolling stabilizer lift 10 is operated in a fashion generally similar to a forklift, with some differences.

The rolling stabilizers 16,18, may be adjusted to a greater width for maximum stability or may be narrowed for narrower loads or to pass through a confined area such as a doorway. This is accomplished by releasing the locking device 60, sliding the stabilizers 16,18 to position and re-engaging the locking device 60.

In moving over uneven ground the pivotably connected attachment plate 12 maintains ground engagement of the castering wheel assembly 50 to support and stabilize the load. In the case of extremely uneven ground or if the rolling stabilizer lift is raised from the ground by a lift arm equipped loader, one of the rotation stops 30 impinges upon the sleeve 58 to prevent the rolling stabilizer lift 10 from rotating so far as to topple the load to the side. For example if one of the castering wheel assemblies 50 drops into a hole the rotation stop 30 will prevent it from dropping to a point that would tip the load.

Once a load is lifted it may be pitched backward toward the power unit 102 for additional stability by pitching the lift arms 112 of the power unit 102, if so equipped. Downward angling of the support arms 54 facilitates this.

Two hydraulic circuit paths are employed, one for lifting loads and the other for lowering them. Referring to FIG. 6, for lifting, four way direction control valve 100 is moved to the right. Hydraulic fluid from pressure 104 flows through the up control valve port 84 to pressure reducing valve 74. If the pressure exceeds the preset value excess fluid is bled off through down lift cylinder port 80, through down control valve port 76 and returns to tank 108. The main fluid flow forces open pilot operated check valve 72 and flows to double acting cylinder 106 raising the load. When four way direction control valve 100 is returned to center pressure is removed, pilot operated check valve 72 closes and the load is held in the lifted position.

To lower the load, four way direction control valve 100 is moved to the left and fluid flows through down control valve port 76, pressure is applied to pilot operated check valve 72 via branch 110 opening pilot operated check valve 72 allowing load to lower. The main fluid flow continues on to double acting cylinder 106, lowering the load.

The present invention may be embodied in other specific forms without departing from the essential attributes thereof; therefore, the illustrated embodiments should be considered in all respects as illustrative and not restrictive, reference being made to the appended claims rather than to the foregoing description to indicate the scope of the invention.

TABLE 1

| X | D1(X) | TURNING TORQUE | D2(X) | RESISTIVE TORQUE | Tipping Load L |
|---|---|---|---|---|---|
| −16 | −1136.4 | −568.2 | 5886.4 | 2943.2 | 3214.3 |
| −14 | −645.8 | −322.9 | 5395.8 | 2697.9 | 3428.6 |
| −12 | −230.8 | −115.4 | 4980.8 | 2490.4 | 3642.9 |
| −10 | 125.0 | 62.5 | 4625.0 | 2312.5 | 3857.1 |
| −8 | 433.3 | 216.7 | 4316.7 | 2158.3 | 4071.4 |
| −6 | 703.1 | 351.6 | 4046.9 | 2023.4 | 4285.7 |
| −4 | 941.2 | 470.6 | 3808.8 | 1904.4 | 4500.0 |

TABLE 1-continued

| X | D1(X) | TURNING TORQUE | D2(X) | RESISTIVE TORQUE | Tipping Load L |
|---|---|---|---|---|---|
| −2 | 1152.8 | 576.4 | 3597.2 | 1798.6 | 4714.3 |
| 0 | 1342.1 | 671.1 | 3407.9 | 1703.9 | 4928.6 |
| 2 | 1512.5 | 756.3 | 3237.5 | 1618.8 | 5142.9 |
| 4 | 1666.7 | 833.3 | 3083.3 | 1541.7 | 5357.1 |
| 6 | 1806.8 | 903.4 | 2943.2 | 1471.6 | 5571.4 |
| 8 | 1934.8 | 967.4 | 2815.2 | 1407.6 | 5785.7 |
| 10 | 2052.1 | 1026.0 | 2697.9 | 1349.0 | 6000.0 |
| 12 | 2160.0 | 1080.0 | 2590.0 | 1295.0 | 6214.3 |
| 14 | 2259.6 | 1129.8 | 2490.4 | 1245.2 | 6428.6 |
| 16 | 2351.9 | 1175.9 | 2398.1 | 1199.1 | 6642.9 |
| 18 | 2437.5 | 1218.8 | 2312.5 | 1156.3 | 6857.1 |
| 20 | 2517.2 | 1258.6 | 2232.8 | 1116.4 | 7071.4 |
| 22 | 2591.7 | 1295.8 | 2158.3 | 1079.2 | 7285.7 |
| 24 | 2661.3 | 1330.6 | 2088.7 | 1044.4 | 7500.0 |
| 26 | 2726.6 | 1363.3 | 2023.4 | 1011.7 | 7714.3 |
| 28 | 2787.9 | 1393.9 | 1962.1 | 981.1 | 7928.6 |
| 30 | 2845.6 | 1422.8 | 1904.4 | 952.2 | 8142.9 |
| 32 | 2900.0 | 1450.0 | 1850.0 | 925.0 | 8357.1 |
| 34 | 2951.4 | 1475.7 | 1798.6 | 899.3 | 8571.4 |
| 36 | 3000.0 | 1500.0 | 1750.0 | 875.0 | 8785.7 |
| 38 | 3046.1 | 1523.0 | 1703.9 | 852.0 | 9000.0 |

What is claimed is:

1. An attachment adapted for removable coupling with a mobile power unit, for lifting, transporting and placing loads comprising:

a coupling member, adapted for removable, operable coupling of said attachment to said mobile power unit;

a lifting assembly, operably coupled to said coupling member, said lifting assembly including a load engaging member extending generally outwardly and forwardly from a lifting mast, said load engaging member being shiftable between a lowered position and a raised position;

a stabilizing assembly operably coupled to said lifting assembly including a pair of opposed, ground engaging, stabilizing arms extending generally forwardly, and laterally from said lifting assembly such that said load engaging member can be shifted between said raised and lowered positions clear of and laterally interposed between said arms; and said ground engaging stabilizing arms being adapted such that the lifted load is substantially centered between said ground engaging, stabilizing arms and substantially centered over a line defined between two points at which said arms engage the ground and in which locations of the two points are optimized by selecting the two points such that the summation of turning torque, tipping load and resistive torque is substantially minimized.

2. The invention as claimed in claim 1, said stabilizing arms each comprising a laterally extending member and a forwardly extending member operably coupled to said laterally extending member.

3. The invention as claimed in claim 2, said laterally extending members each having a proximate portion generally adjacent said lifting assembly and a distal end spaced apart from said lifting assembly, said forwardly extending members each being operably coupled to respective distal ends such that said forwardly extending members are spaced apart from said lifting assembly.

4. The invention as claimed in claim 3, said stabilizing arm laterally extending members each being adjustable in length.

5. The invention as claimed in claim 2, said forwardly extending members each including a ground engaging wheel.

6. The invention as claimed in claim 5, said ground engaging wheels comprising caster wheels.

7. The attachment as claimed in claim 1, said lifting assembly including a hydraulic system for shifting said load engaging member from a lowered position to a raised position and back, said hydraulic system including a safety valve assembly which requires that hydraulic pressure be applied to said hydraulic system in order to shift said load engaging member from a raised position to a lowered position.

8. The attachment as claimed in claim 7, said hydraulic safety valve assembly including:
   a pilot operated check valve; a pressure relief valve; and a fluid path requiring pilot pressure at said pilot operated check valve in order to lower a lifted load.

9. The attachment as claimed in claim 7, said hydraulic lifting system having a lifting fluid path, said lifting fluid path comprising:
   a pressure relief valve;
   a pilot operated check valve; and
   a double acting cylinder in series with said pressure relief valve and said pilot operated check valve.

10. The attachment as claimed in claim 7, said hydraulic lifting system having a lowering fluid path, said lowering fluid path comprising:
    a double acting hydraulic cylinder;
    a pilot operated check valve;
    said double acting hydraulic cylinder being connected in series with said pilot operated check valve: and
    a fluid path requiring pilot pressure at said pilot operated check valve in order to lower said double acting hydraulic cylinder.

11. The attachment as claimed in claim 7, said hydraulic lifting system having a lifting fluid path, said lifting fluid path comprising:
    a pressure relief valve;
    a pilot operated check valve;
    a double acting cylinder in series with said pressure relief valve and said pilot operated check valve; and
    said hydraulic lifting system having a lowering fluid path, said lowering fluid path comprising:
    a double acting hydraulic cylinder;
    a pilot operated check valve;
    said double acting hydraulic cylinder being connected in series with said pilot operated check valve; and
    a fluid path requiring pilot pressure at said pilot operated check valve in order to lower said double acting hydraulic cylinder.

12. An attachment for a mobile power unit, having an available turning torque, adapted for lifting, transporting and placing loads, said attachment having a resistive torque and a tipping load, comprising:
    a coupling member, adapted for removable attachment to said mobile power unit;
    a lifting assembly;
    a load engaging member, operably connected to said lifting member; and
    a pair of opposed, ground engaging, stabilizing arms extending generally outwardly and laterally from said lifting assembly whereby said load engaging member can be shifted between said raised and lowered positions clear of and laterally interposed between said arms, each said stabilizing arm having an arm length, operably connected to said load engaging member in which said arm length is optimized by selecting it such that the summation of turning torque, tipping load and resistive torque is substantially minimized.

13. The attachment as claimed in claim 12, in which said summation of turning torque, tipping load and resistive torque is graphed versus arm length and said arm length is selected such that it falls on the summation curve where the slope is substantially zero.

14. The attachment as claimed in claim 12, further comprising:
    a coupling member, adapted for removable, operable coupling of said attachment to said mobile power unit;
    a lifting assembly, operably coupled to said coupling member, said lifting assembly including a load engaging member extending generally outwardly and forwardly from a lifting mast, said load engaging member being shiftable between a lowered position and a raised position; and
    a stabilizing assembly operably coupled to said lifting assembly including a pair of opposed, ground engaging, stabilizing arms extending generally forwardly, and laterally from said lifting assembly such that said load engaging member can be shifted between said raised and lowered positions clear of and laterally interposed between said arms.

15. The invention as claimed in claim 14, said stabilizing arms each comprising a laterally extending member and a forwardly extending member operably coupled to said laterally extending member.

16. The invention as claimed in claim 14, said laterally extending members each having a proximate portion generally adjacent said lifting assembly and a distal end spaced apart from said lifting assembly, said forwardly extending members each being operably coupled to respective distal ends such that said forwardly extending members are spaced apart from said lifting assembly.

17. The invention as claimed in claim 14, said stabilizing arm laterally extending members each being adjustable in length.

18. The invention as claimed in claim 14, said forwardly extending members each including a ground engaging caster wheel.

19. The attachment as claimed in claim 14, said lifting assembly including a hydraulic system for shifting said load engaging member from a lowered position to a raised position and back, said hydraulic system including a safety valve assembly which requires that hydraulic pressure be applied to said hydraulic system in order to shift said load engaging member from a raised position to a lowered position.

20. The attachment as claimed in claim 19, said hydraulic safety valve assembly including:
    a pilot operated check valve; a pressure relief valve; and a fluid path requiring pilot pressure at said pilot operated check valve in order to lower a lifted load.

\* \* \* \* \*